Aug. 20, 1946.   J. L. POTTER   2,406,252
FISHING DEVICE
Filed Nov. 23, 1944   2 Sheets-Sheet 1
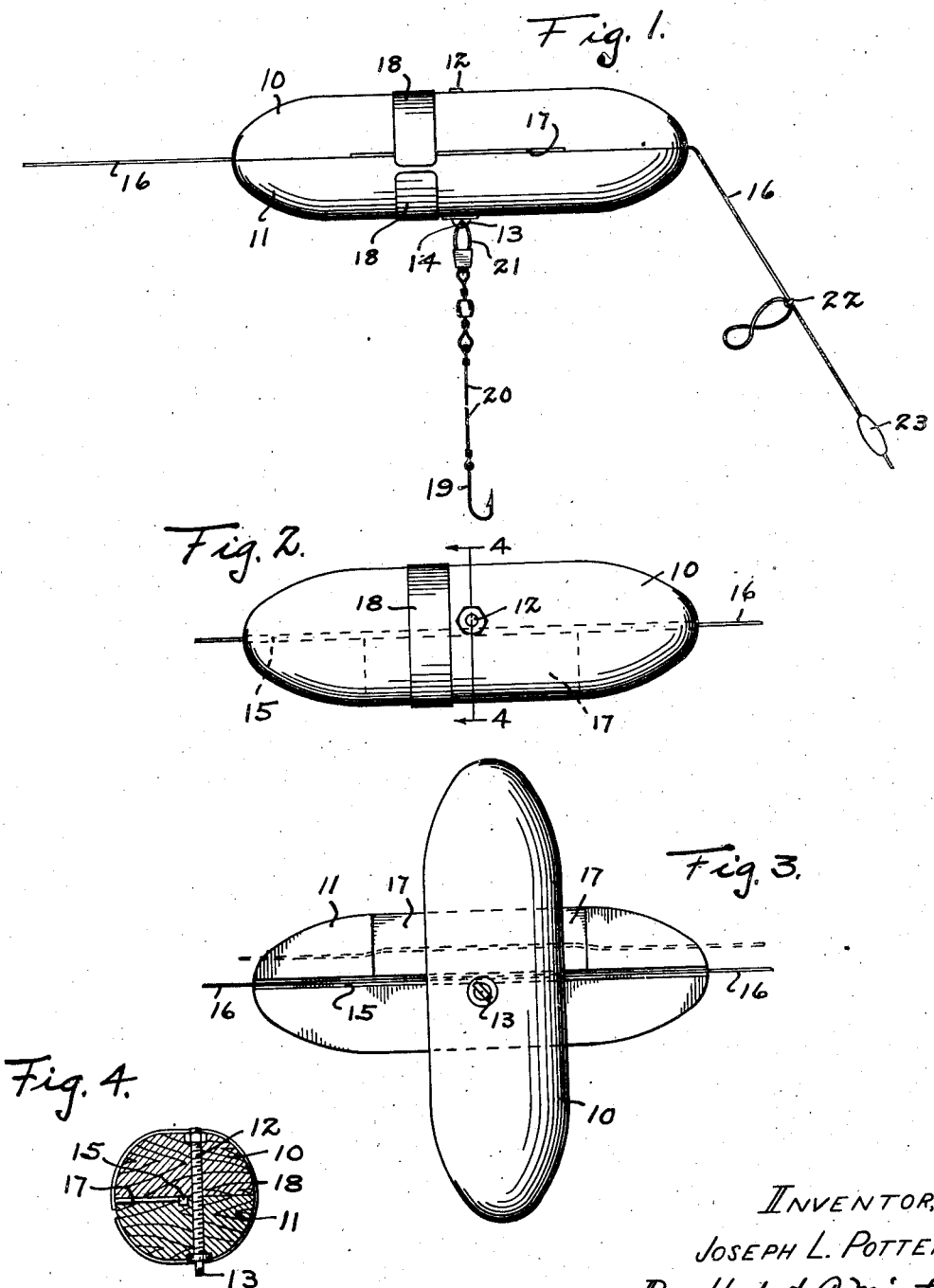
INVENTOR.
JOSEPH L. POTTER,
By Herbert A. Minturn
ATTORNEY.

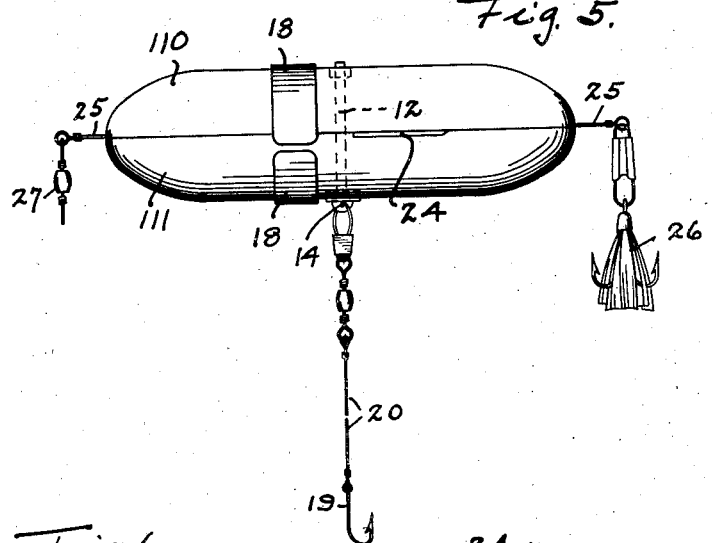
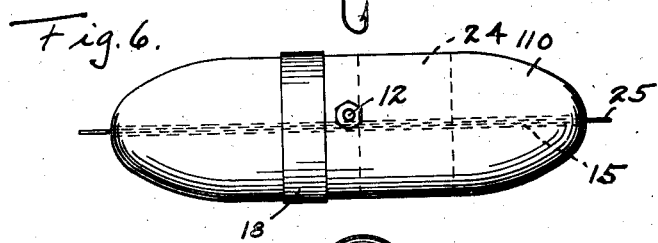
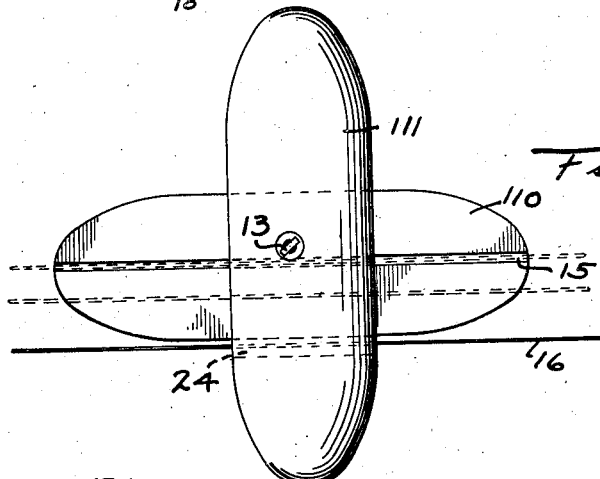
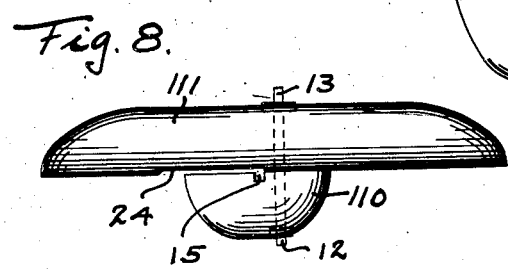

Patented Aug. 20, 1946

2,406,252

UNITED STATES PATENT OFFICE 2,406,252

FISHING DEVICE

Joseph L. Potter, Indianapolis, Ind.

Application November 23, 1944, Serial No. 564,769

8 Claims. (Cl. 43—49)

This invention relates to a combination fishing device made in two sections whereby shifting of one section relative to the other section will permit passing of a line between the sections to enter a groove carried in at least one of those sections. The invention permits not only the use of the structure as a float for still fishing, but provides for its use as a casting plug, and also when properly weighted, as a means for disengaging a hook on a line from some submerged object, such as a log. Other objects and advantages of the invention will become apparent to those versed in the art in the following description of the invention as illustrated in the accompanying drawings, in which Fig. 1 is a view in side elevation of a structure embodying the invention;

Fig. 2, a top plan view;

Fig. 3, an under-side elevation with one of the sections revolved in relation to the other 90 degrees from the normal position;

Fig. 4, a view in transverse vertical section on the line 4—4 in Fig. 2;

Fig. 5, a view in side elevation of a slightly modified form of the invention;

Fig. 6, a top plan view thereof;

Fig. 7, a bottom plan view with the under section revolved 90 degrees in respect to the upper section; and Fig. 8, a view in side elevation of the structure with its elements disposed as indicated in Fig. 7.

Like characters of reference indicate like parts throughout the several views in the drawings.

Referring first to that form of the invention as illustrated in Figs. 1-4, the float is formed by upper and lower members 10 and 11 respectively normally held one against the other preferably with frictional or compressive engagement by any suitable means, herein shown as by means of a through bolt 12, the underside of which is provided with a head 13 having an eye 14 therethrough. When the two sections 10 and 11 are aligned one with the other, they may assume the general over-all exterior contour desired. Where the structure is to be employed selectively as for a float at one time and a casting plug at another time, the over-all shape may be lozenge formed as illustrated.

One of the members, herein shown as lower member 11, is provided with a longitudinal slot 15 across its upper face normally covered by the upper member 10. The bolt 12 passes through both members 10 and 11 to one side of the slot 15. The purpose of this slot 15 is to receive therethrough the line 16 preferably with a free-running fit.

To facilitate entrance of the line 16 into the longitudinal slot 15, a mid-portion of the member 11 is cut away from the outer side back to the slot to form the recess 17 longer than the width of the member 10, Fig. 3. The line 16 may be looped under the member 10, Fig. 3, in the position indicated by the dash lines and then pulled over the member 11 until it drops into the slot 15, when the member 10 is turned relative to the member 11 to some such position as indicated in Fig. 3 whereby ends of the recess 17 are uncovered. The purpose of the recess 17 is to give clearance between the two members 10 and 11 back to the slot 15.

When the line 16 is thus positioned through the slot 15 the members 10 and 11 are relatively turned one with respect to the other back to their positions as indicated in Figs. 1, 2, and 4. The interengaging means, the bolt 12 in the present form, is preferably made to hold these two members 10 and 11 firmly one against the other to prevent normal displacement. A safety means may be added, herein shown as in the nature of a split ring 18 which elastically engages around the two members 10 and 11 to prevent relative turning thereof one in respect to the other.

The line 16 may be allowed to run freely through the slot 15 if desired so that there is relative movement between the float and the line. It may be desirable to attach a hook 19 to the float, such as through the leader 20 by a clasp 21 passing through the eye 14 of the bolt head 13. A knot 22 may be placed in the line 16 to limit the relative outward travel of the float along the line 16 particularly in reference to the extreme outer portion of the line 16 which may carry a sinker 23. Of course, the outer end of the line 16 may carry a hook (not shown) in the usual manner whereby the members 10 and 11 being of any suitable buoyant material will serve in the customary manner as a float.

Referring to the other form of the invention as shown in Figs. 5—8, the same two members 110 and 111 are indicated as one being a complementary part of the other to form a complete float member. In this case, the member 110 is provided with the longitudinal groove 15 entirely thereacross to receive the line 16 as before. Then the other member 110 is provided with a recess 24 thereacross cut back far enough, Fig. 8, to extend over the groove 15 when the two members 110 and 111 are revolved 90 degrees apart. The purpose of the recess 24 is to permit easy insertion of the line 16 across and within the groove 15 without having to take apart the two members 110 and 111 or separate them a sufficient distance to give clearance for the line therebetween. As indicated in Fig. 7, the line 16 is brought up into the recess 24 and then shoved back across the face of the member 111 until the line may be dropped into the groove 15. The securing bolt 12 is placed to one side of the groove 15 and back of the recess 24 so as to be clear of the line 16.

As indicated in Fig. 5, this form, as well as the form shown in Figs. 1–4, may be employed as a casting plug by placing a line or even a wire leader 25 in the groove 15 whereby one end of the leader 25 may carry any suitable lure 26 on one end and have some line engaging means on the other end, such as the usual swivel 27. Then in addition a hook may be attached to the head of the bolt 12 as before, all as may be desired by the user to meet his own conditions and whims.

As above indicated the members 10 and 11 or 110 and 111 particularly when used as a float are made out of any buoyant material, such as wood, cork, and the like. Assuming that the float is being used in the manner indicated in Fig. 1 wherein the line 16 is free to slide through the float particularly under the influence of the sinker 23 carrying the line down toward the bottom of the water, and further assuming that the lower end of that line 16 becomes snagged upon some submerged object, then the float may have sufficient weight applied thereto to cause it to sink and slide down the line 16 and drop below the submerged article so as to apply a downward pull on the line rather than an upward pull. In many instances this action will tend to release the line from the object.

Thus it is to be seen that the invention permits wide range of uses whereby the single structure may be employed in place of many other structures restricted to but one use. While the member 12 has been referred to as a bolt, it may simply be a post anchored in one member with the other member rotatably mounted thereon, the essential purpose being that there be relative movement between the two members 10 and 11 and 110 and 111 to permit insertion and removal of the line 16 from therebetween.

While I have herein shown my invention in the best forms as now known to me, it is obvious that structural variations may be employed, particularly in the shaping of the various members, with the interengagement between the two body members, and other materials may be employed, all without departing from the spirit of the invention, and I therefore do not desire to be limited to those precise forms beyond the limitations as may be imposed by the following claims.

I claim:

1. For fishing purposes, a device to be used in conjunction with a leader or a line comprising a two part body; means shiftably securing said two parts one to the other; one of said parts having a groove thereacross to receive slidingly therein said line; and said other part being normally positioned across the groove to retain the line therein; said securing means consisting of a post around which one of said parts may rotate in respect to the other; one of said parts being recessed from one edge on its side opposite the other part, said recess extending across the side to said groove, said post being on the side of said groove opposite to that of said recess.

2. For fishing purposes, a device to be used in conjunction with a leader or a line comprising a two part body; means shiftably securing said two parts one to the other; one of said parts having a groove thereacross to receive slidingly therein said line; and said other part being normally positioned across the groove to retain the line therein; said securing means consisting of a post around which one of said parts may rotate in respect to the other; one of said parts being recessed from one edge on its side opposite the other part, said recess extending across the side to said groove, said post being on the side of said groove opposite to that of said recess; said recess being in that part containing said groove.

3. For fishing purposes, a device to be used in conjunction with a leader or a line comprising a two part body; means shiftably securing said two parts one to the other; one of said parts having a groove thereacross to receive slidingly therein said line; and said other part being normally positioned across the groove to retain the line therein; said securing means consisting of a post around which one of said parts may rotate in respect to the other; one of said parts being recessed from one edge on its side opposite the other part, said recess extending across the side to said groove, said post being on the side of said groove opposite to that of said recess; said recess being limited in length adjacent said post to leave full thickness of the recessed part on each side of the recess for bearing against said other part to serve as means retaining the line within said groove.

4. For fishing purposes, a device to be used in conjunction with a leader or a line comprising a two part body; means shiftably securing said two parts one to the other; one of said parts having a groove thereacross to receive slidingly therein said line; and said other part being normally positioned across the groove to retain the line therein; said securing means consisting of a post around which one of said parts may rotate in respect to the other; one of said parts being recessed from one edge on its side opposite the other part, said recess extending across the side to said groove, said post being on the side of said groove opposite to that of said recess; said recess being in said other part.

5. In a fishing device to operate in conjunction with a leader or a line, a two part body fitting one part against the other by matching surfaces; a post interengaging the two body parts to have one part at least rotatable around the post whereby the surface of one part will shift parallel with that of the other part; a groove across the surface of one part opening from opposite sides thereof and deep enough to receive slidingly said line thereacross; and the said surface of said grooved part being recessed in part for a distance greater than the width of said other part when rotated substantially at right angles thereto.

6. In a fishing device to operate in conjunction with a leader or a line, a two part body fitting one part against the other by matching surfaces; a post interengaging the two body parts to have one part at least rotatable around the post whereby the surface of one part will shift parallel with that of the other part; a groove across the surface of one part opening from opposite sides thereof and deep enough to receive slidingly said line thereacross; and the said surface of the non-grooved part being recessed for a distance from said groove to outside of the edge of the grooved part as measured when the non-grooved part is rotated to approximately ninety degrees from its normal position over said groove.

7. In a fishing device to operate in conjunction with a leader or a line, a two part body fitting one part against the other by matching surfaces; a post interengaging the two body parts to have one part at least rotatable around the post whereby the surface of one part will shift parallel with that of the other part; a groove across the surface of one part opening from opposite sides thereof and deep enough to receive slidingly said line thereacross; and the said surface of said grooved part being recessed in part for a distance greater than the width of said other part when rotated substantially at right angles thereto; said post being to that side of said groove removed from said recess.

8. In a bobber or carrier, two segments, and a post carried by one segment, the post engaging the other segment to tighten one segment against the other and also carrying means for attaching a leader thereto, one of the segments having a groove thereacross opening toward the other segment to carry a line along which the segments may travel.

JOSEPH L. POTTER.